United States Patent
Kwon et al.

(10) Patent No.: US 9,401,780 B2
(45) Date of Patent: Jul. 26, 2016

(54) METHOD FOR TRANSMITTING CONTROL INFORMATION IN WIRELESS COMMUNICATION SYSTEM AND APPARATUS THEREFOR

(71) Applicant: LG ELECTRONICS INC., Seoul (KR)

(72) Inventors: Yeong Hyeon Kwon, Anyang-si (KR); Jae Hoon Chung, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/553,771

(22) Filed: Nov. 25, 2014

(65) Prior Publication Data
US 2015/0078320 A1 Mar. 19, 2015

Related U.S. Application Data

(63) Continuation of application No. 13/254,323, filed as application No. PCT/KR2010/001810 on Mar. 24, 2010.

(60) Provisional application No. 61/164,461, filed on Mar. 29, 2009, provisional application No. 61/172,201, filed on Apr. 23, 2009, provisional application No. 61/177,286, filed on May 12, 2009.

(51) Int. Cl.
*H04L 1/16* (2006.01)
*H04L 1/18* (2006.01)
(Continued)

(52) U.S. Cl.
CPC ............ *H04L 1/1614* (2013.01); *H04L 1/1854* (2013.01); *H04L 1/1858* (2013.01);
(Continued)

(58) Field of Classification Search
CPC ... H04L 5/0053; H04L 5/0055; H04L 1/1614; H04L 1/1854; H04L 1/1861; H04L 1/1858; H04L 1/0003; H04L 1/1692; H04W 72/04; H04W 72/0453; H04W 84/025; H04W 72/042
USPC .................. 370/329, 341, 431, 464
See application file for complete search history.

(56) References Cited

U.S. PATENT DOCUMENTS 8,553,529 B2 10/2013 Chung et al.
2006/0034174 A1* 2/2006 Nishibayashi et al. ....... 370/235
(Continued)

FOREIGN PATENT DOCUMENTS

CN 101228731 A 7/2008
KR 10-2007-0011030 A 1/2007
(Continued)

OTHER PUBLICATIONS

Catt, Ritt, "Carrier Aggregation for LTE-A", 3GPP TSG RAN WG1 meetng #55bis, R1-090187, Ljubljana, Slovenia, Jan. 12-16, 2009, pp. 1-4.
(Continued)

*Primary Examiner* — Hoang-Chuong Vu
(74) *Attorney, Agent, or Firm* — Birch, Stewart, Kolasch & Birch, LLP

(57) ABSTRACT

A method for receiving Acknowledgement/Negative Acknowledgement (ACK/NACK) information at a base station in a wireless communication system. The method according to one embodiment includes transmitting a plurality of transport blocks through a plurality of downlink carriers to a user equipment. Each of the plurality of downlink carriers carries two or more transport blocks. The method according to the embodiment further includes, after transmitting the plurality of transport blocks, receiving the ACK/NACK information through one uplink carrier from the user equipment. The ACK/NACK information includes ACK/NACK bits corresponding to the plurality of transport blocks, and the ACK/NACK bits are concatenated in accordance with an index order of the downlink carriers and an index order of the two or more transport blocks associated with each of the downlink carriers.

6 Claims, 23 Drawing Sheets

(51) Int. Cl.
*H04L 5/00* (2006.01)
*H04W 72/04* (2009.01)
*H04L 1/00* (2006.01)
*H04W 72/12* (2009.01)

(52) U.S. Cl.
CPC ............ *H04L1/1861* (2013.01); *H04L 5/0007* (2013.01); *H04L 5/0053* (2013.01); *H04W 72/042* (2013.01); *H04L 1/0003* (2013.01); *H04L 1/1692* (2013.01); *H04W 72/1278* (2013.01)

(56) References Cited

U.S. PATENT DOCUMENTS

| | | | |
|---|---|---|---|
| 2008/0151938 A1* | 6/2008 | Yang | H04L 1/1692 370/479 |
| 2008/0232307 A1 | 9/2008 | Pi et al. | |
| 2008/0293424 A1 | 11/2008 | Cho et al. | |
| 2009/0055703 A1 | 2/2009 | Kim et al. | |
| 2010/0002647 A1 | 1/2010 | Ahn et al. | |
| 2010/0074120 A1 | 3/2010 | Bergman et al. | |
| 2010/0098005 A1* | 4/2010 | Lee | H04L 1/1861 370/329 |
| 2010/0172290 A1 | 7/2010 | Nam et al. | |
| 2010/0172308 A1 | 7/2010 | Nam et al. | |
| 2010/0172428 A1* | 7/2010 | Pani | H04L 1/0026 375/262 |
| 2010/0202396 A1 | 8/2010 | Won et al. | |
| 2010/0232382 A1* | 9/2010 | Gauvreau et al. | 370/329 |
| 2010/0238886 A1* | 9/2010 | Sambhwani et al. | 370/329 |
| 2010/0322114 A1 | 12/2010 | Li et al. | |
| 2011/0013536 A1* | 1/2011 | Falahati et al. | 370/252 |
| 2011/0128942 A1 | 6/2011 | Kim et al. | |
| 2011/0164664 A1* | 7/2011 | Torsner et al. | 375/219 |
| 2011/0205996 A1* | 8/2011 | Kim et al. | 370/329 |
| 2011/0243088 A1 | 10/2011 | Ahn et al. | |
| 2011/0261729 A1 | 10/2011 | Ahn et al. | |
| 2011/0280203 A1 | 11/2011 | Han et al. | |
| 2011/0299490 A1 | 12/2011 | Nordstrom et al. | |
| 2012/0051310 A1 | 3/2012 | Cho et al. | |
| 2012/0063400 A1* | 3/2012 | Papasakellariou et al. | 370/329 |
| 2012/0106569 A1* | 5/2012 | Che et al. | 370/437 |

FOREIGN PATENT DOCUMENTS

| | | |
|---|---|---|
| KR | 10-2008-0096088 A | 10/2008 |
| KR | 10-2009-0017408 A | 2/2009 |
| KR | 10-2009-0019662 A | 2/2009 |

OTHER PUBLICATIONS

Huawei, "PUCCH design for carrier aggregation", 3GPP TSG RAN WG1#bis, R1-090126, Ljubljana, Slovenia, Jan. 12-16, 2009, pp. 1-8.

* cited by examiner

Single component carrier (e.g. LTE system)

PUCCH format 1a and 1b structure (normal CP case)

FIG. 12

| | | | | | | | | | | |
|---|---|---|---|---|---|---|---|---|---|---|
| In case of non-MIMO | A/N for DL CC #1 | A/N for DL CC #2 | A/N for DL CC #3 | A/N for DL CC #4 | A/N for DL CC #5 | x | x | x | x | x |
| In case of MIMO | A/N for TB1 in DL CC #1 | A/N for TB2 in DL CC #1 | A/N for TB1 in DL CC #2 | A/N for TB2 in DL CC #2 | A/N for TB1 in DL CC #3 | A/N for TB2 in DL CC #3 | A/N for TB1 in DL CC #4 | A/N for TB2 in DL CC #4 | A/N for TB1 in DL CC #5 | A/N for TB2 in DL CC #5 |
| In case of mixed transmission mode | A/N for TB1 in DL CC #1 | A/N for TB2 in DL CC #1 | A/N for TB1 in DL CC #2 | A/N for TB2 in DL CC #2 | A/N for DL CC #3 | A/N for DL CC #4 | A/N for DL CC #5 | x | x | x |

FIG. 13

| A/N/DTX for DL CC #1 | A/N/DTX for DL CC #2 | A/N/DTX for DL CC #3 | A/N/DTX for DL CC #4 | A/N/DTX for DL CC #5 | x | x | x |

2 bits per CC

In case of non-MIMO

METHOD FOR TRANSMITTING CONTROL INFORMATION IN WIRELESS COMMUNICATION SYSTEM AND APPARATUS THEREFOR

CROSS-REFERENCE TO RELATED APPLICATIONS

This application is a continuation of co-pending U.S. patent application Ser. No. 13/254,323 filed on Sep. 1, 2011, which is the national phase of PCT International Application No. PCT/KR2010/001810 filed on Mar. 24, 2010, which claims the benefit of U.S. Provisional Application Nos. 61/164,461 filed on Mar. 29, 2009, 61/172,201 filed on Apr. 23, 2009, and 61/177,286 filed on May 12, 2009, the entire contents of all of the above applications are hereby incorporated by reference.

BACKGROUND OF THE INVENTION

1. Field of the Invention

The present invention relates to a method for transmitting a control signal in a wireless communication system, and more particularly, to a method for transmitting ACK/NACK signal from a user equipment in a wireless communication system to which carrier aggregation is applied.

2. Discussion of the Related Art

A $3^{rd}$ generation partnership project long term evolution (3GPP LTE) communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the user equipment of time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, adaptable use of frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of component carriers. Carrier aggregation allows a plurality of component carriers to be used as one logical frequency band, whereby a wider frequency band is used. A bandwidth of each component carrier can be defined based on a bandwidth of a system block used in the LTE system.

SUMMARY OF THE INVENTION

Accordingly, the present invention is directed to a method for transmitting a control signal in a wireless communication system and an apparatus therefor, which substantially obviate one or more problems due to limitations and disadvantages of the related art.

An object of the present invention is to provide a method and apparatus for transmitting ACK/NACK signal in a wireless communication system to which carrier aggregation is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting ACK/NACK (Acknowledgement/Negative ACK) signals in a wireless communication system comprises receiving a plurality of data blocks from a base station; generating ACK/NACK signals corresponding to the plurality of data blocks; allocating resources for transmitting the ACK/NACK signals, wherein the resources are allocated independently per slot; and transmitting the ACK/NACK signals through one uplink component carrier by using the allocated resources. In this case, the plurality of data blocks are received at the same time through a plurality of downlink component carriers. Preferably, step of receiving a plurality of data blocks includes receiving two or more data blocks through at least one downlink component carrier among the plurality of downlink component carriers.

More preferably, the step of allocating resources includes allocating the resources to minimize the difference in the number of the ACK/NACK signals transmitted per slot.

In another aspect of the present invention, a method for transmitting ACK/NACK (Acknowledgement/Negative ACK) signals in a wireless communication system comprises receiving a plurality of data blocks through a plurality of downlink component carriers from a base station; generating ACK/NACK signals corresponding to the plurality of data blocks; mapping the ACK/NACK signals into a bit index; allocating control channel resources for transmitting the bit index; and transmitting the bit index through one uplink component carrier by using the allocated control channel resources. In this case, the control channel resources are payload of PUCCH (physical uplink control channel) format 2.

In still another aspect of the present invention, a method for transmitting ACK/NACK (Acknowledgement/Negative ACK) signals in a wireless communication system comprises receiving a plurality of data blocks through a plurality of downlink component carriers from a base station; generating ACK/NACK signals corresponding to the plurality of data blocks; allocating containers for transmitting the ACK/NACK signals in control channel resources in accordance with an index order of the downlink component carriers as much as the received data blocks; and transmitting the ACK/NACK signals through one uplink component carrier by using the allocated containers. Likewise, the control channel resources are preferably payload of PUCCH (physical uplink control channel) format 2.

More preferably, the step of receiving a plurality of data blocks includes receiving two or more data blocks through at least one downlink component carrier among the plurality of downlink component carriers, and the step of allocating containers includes allocating the containers in accordance with the order of the data blocks received through the at least one downlink component carrier.

Further still another aspect of the present invention, a user equipment comprises a receiving module receiving a plurality of data blocks from a base station; a processor generating ACK/NACK signals corresponding to the plurality of data blocks and allocating resources for transmitting the ACK/NACK signals, wherein the resources are allocated independently per slot; and a transmitting module transmitting the ACK/NACK signals through one uplink component carrier by using the allocated resources. In this case, the receiving module receives the plurality of data blocks at the same time through a plurality of downlink component carriers. Preferably, the receiving module receives two or more data blocks through at least one downlink component carrier among the plurality of downlink component carriers.

More preferably, the processor allocates the resources to minimize the difference in the number of the ACK/NACK signals transmitted per slot.

In further still another aspect of the present invention, a user equipment comprises a receiving module receiving a plurality of data blocks at the same time through a plurality of downlink component carriers from a base station; a processor generating ACK/NACK signals corresponding to the plurality of data blocks, mapping the ACK/NACK signals into a bit index, and allocating control channel resources for transmitting the bit index; and a transmitting module transmitting the bit index through one uplink component carrier by using the allocated control channel resources. In this case, the control channel resources are preferably payload of PUCCH (physical uplink control channel) format 2.

In further still another aspect of the present invention, a user equipment comprises a receiving module receiving a plurality of data blocks at the same time through a plurality of downlink component carriers from a base station; a processor generating ACK/NACK signals corresponding to the plurality of data blocks and allocating containers for transmitting the ACK/NACK signals in control channel resources in accordance with an index order of the downlink component carriers as much as the received data blocks; and a transmitting module transmitting the ACK/NACK signals through one uplink component carrier by using the allocated containers. Likewise, the control channel resources are preferably payload of PUCCH (physical uplink control channel) format 2.

More preferably, the receiving module receives a plurality of data blocks includes receiving two or more data blocks through at least one downlink component carrier among the plurality of downlink component carriers, and the processor allocates the containers in accordance with the order of the data blocks received through the at least one downlink component carrier.

According to the embodiments of the present invention, ACK/NACK signals can be transmitted efficiently in the wireless communication system to which carrier aggregation is applied.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 is a diagram illustrating a method for allocating a plurality of ACK/NACK information to payload of PUCCH format 2 in accordance with one embodiment of the present invention;

FIG. 13 is a diagram illustrating a method for allocating a plurality of ACK/NACK/DTX information to payload of PUCCH format 2 in accordance with one embodiment of the present invention;

DETAILED DESCRIPTION OF THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single component carrier will be referred to as a legacy system or a narrowband system. By contrast, a system that includes a system band of a plurality of component carriers and uses at least one or more component carriers as a system block of a legacy system will be referred to as an evolved system or a wideband system. The component carrier used as a legacy system block has the same size as that of the system block of the legacy system. On the other hand, there is no limitation in sizes of the other component carriers. However, for system simplification, the sizes of the other component carriers may be determined based on the size of the system block of the legacy system. For example, the 3GPP LTE (Release-8) system and the 3GPP LTE-A (Release-9) system are evolved from the legacy system.

Based on the aforementioned definition, the 3GPP LTE (Release-8) system will herein be referred to as an ITE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition.

Figure 2:
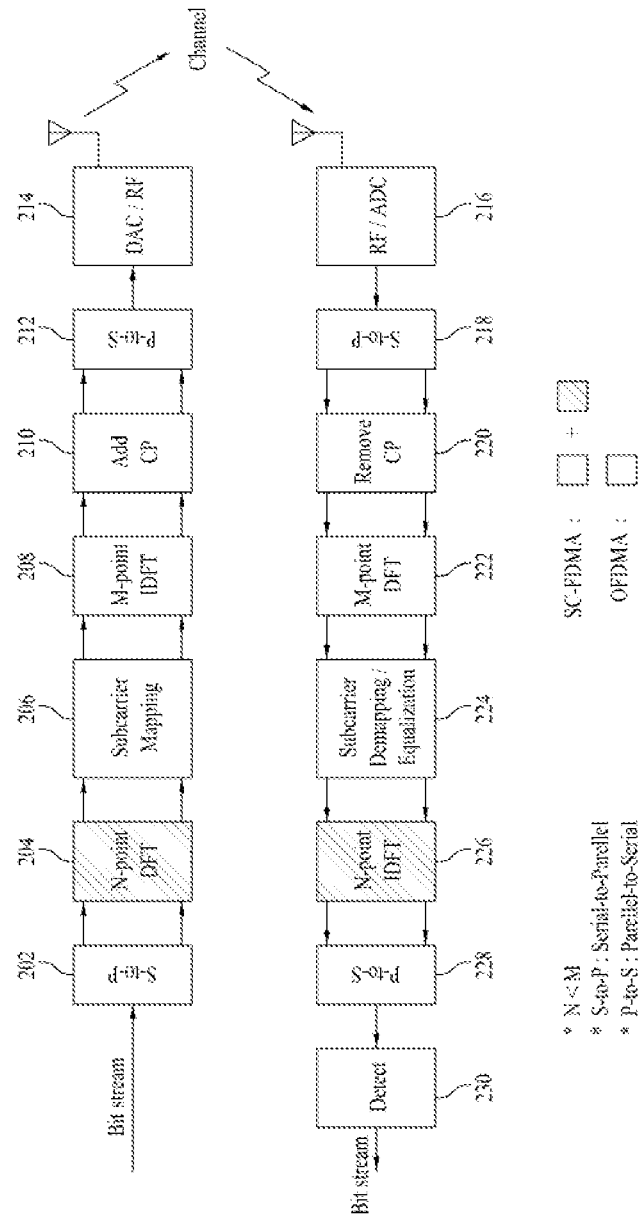
FIG. 2 is a diagram illustrating a transmitter and a receiver for OFDMA and SC-FDMA.

FIG. 2 is a block diagram illustrating a transmitter and a receiver for OFDMA and SC-FDMA. In an uplink, a transmitter 202~214 may be a part of a user equipment, and a receiver 216~230 may be a part of a base station. In a downlink, a transmitter may be a part of a base station, and a receiver may be a part of a user equipment.

Referring to FIG. 2, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from a medium access control (MAC) layer. The bit streams may be designated as codewords, and are equivalent to the data block transferred from the MAC layer. The data block transferred from the MAC layer may be designated as a transmission transport block. Examples of a modulation scheme include, but not limited to, BPSK (binary phase shift keying), QPSK (quadrature phase shift keying), and n-QAM (quadrature amplitude modulation). Afterwards, the data symbol sequences in series are converted to parallel data symbol sequences as much as N (202). N number of data symbols are mapped with N number of subcarriers allocated among a total of M number of subcarriers, and the other M-N number of carriers are padded with 0 (206). The data symbols mapped in a frequency domain are converted to time domain sequences through M-point IDFT processing (208). Afterwards, in order to reduce inter-symbol interference (ISI) and inter-carrier interference (ICI), cyclic prefix is added to the time domain sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). Other user is allocated with available subcarriers among the remaining M-N number of subcarriers. On the other hand, the OFDMA receiver includes an RF/ADC (analog to digital converter) module 216, a serial-to-parallel converter 218, a cyclic prefix (CP) removing module 220, an M-point discrete fourier transform (DFT) module 224, a subcarrier demapping/equalization module 226, a parallel-to-digital converter 228, and a detection module 230. A signal processing procedure of the OFDMA receiver will be configured in reverse order of the OFDMA transmitter.

As compared with the OFDMA transmitter, the SC-FDMA transmitter additionally includes an N-point DFT module 204 prior to the subcarrier mapping module 206. The SC-FDMA transmitter can reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 228 after the subcarrier demapping module 226. A signal processing procedure of the SC-FDMA receiver will be configured in reverse order of the SC-FDMA transmitter.

Figure 3:
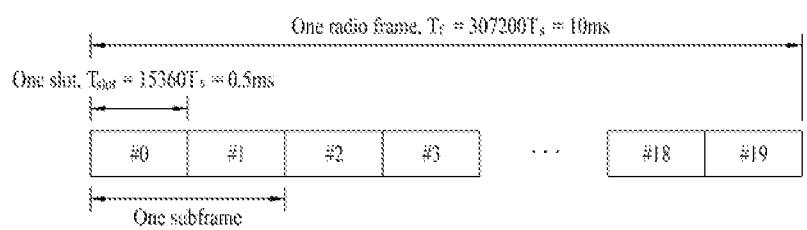
FIG. 3 is a diagram illustrating a structure of a radio frame used in an LTE system.

FIG. 3 is a diagram illustrating a structure of a radio frame used in the LTE system.

Referring to FIG. 3, the radio frame has a length of 10 ms($327200 \cdot T_s$) and includes 10 subframes of an equal size. Each sub frame has a length of 1 ms and includes two slots. Each slot has a length of 0.5 ms($15360 \cdot T_s$). In this case, $T_s$ represents a sampling time, and is expressed by $T_s=1/(15 \text{ kHz} \times 2048)=3.2552 \times 10^{-8}$(about 33 ns). The slot includes a plurality of OFDMA (or SC-FDMA) symbols in a time domain, and includes a plurality of resource blocks (RBs) in a frequency domain. In the LTE system, one resource block includes twelve (12) subcarriers×seven (or six) OFDMA (or SC-FDMA) symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDMA (or SC-FDMA) symbols included in the slot.

Figure 4:
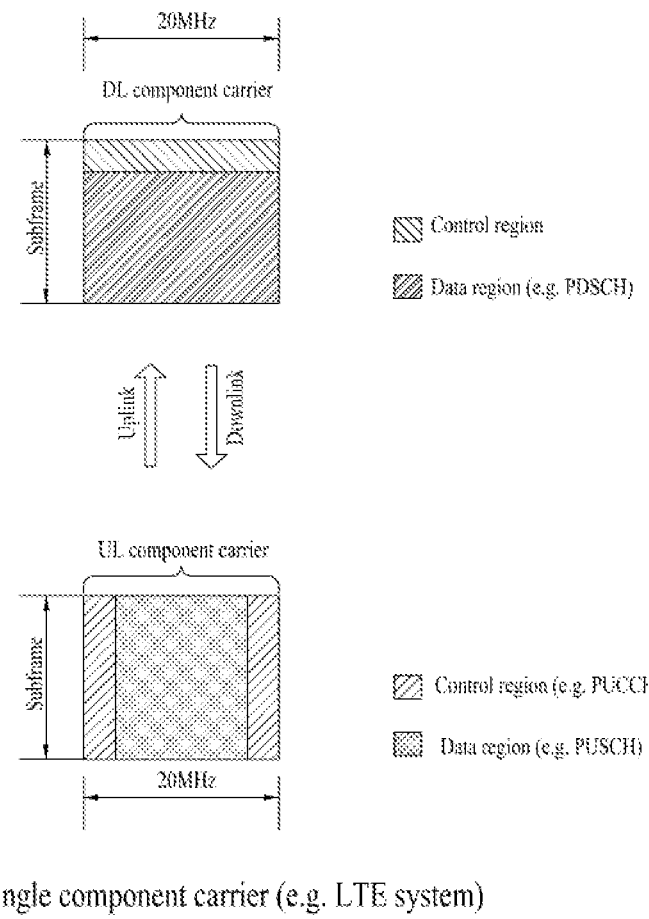
FIG. 4 is a diagram illustrating a structure of a downlink radio frame used in an LTE system.

FIG. 4 is a diagram illustrating an example of communication performed under a single component carrier status. FIG. 4 corresponds to a communication example of the LTE system. In a frequency division duplex (FDD) mode, data transmission and reception is performed through one downlink band and one uplink band corresponding to the downlink band. In more detail, in the FDD mode, the radio frame structure of FIG. 3 is used for downlink transmission or uplink transmission only. On the other hand, in a time division duplex (TDD) mode, the same frequency band is divided into a downlink interval and an uplink interval corresponding to the downlink interval in the time domain. In more detail, in the TDD mode, the radio frame structure of FIG. 3 is divided for downlink transmission and uplink transmission corresponding to the downlink transmission.

A method for performing HARQ (Hybrid Automatic Repeat and request) in a user equipment will be described with reference to FIG. 4. In the LTE system, control information (for example, scheduling information) of downlink data transmission of the base station is transferred to the user equipment through a downlink control channel established within a control region of a downlink subframe. The downlink control channel includes a physical downlink control channel (PDCCH). The user equipment can receive scheduled data through a downlink common channel indicated by scheduling information (for example, resources allocated with data, size of data, coding mode, redundancy version, etc.) after receiving the scheduling information through the control channel. The downlink common channel includes a physical uplink channel (PDSCH). Afterwards, the user equipment can transmit acknowledgement information (for example, HARQ ACK/NACK) in response to downlink data to the base station through the uplink control channel established within the control region of the uplink subframe. The uplink control channel includes a physical uplink control channel (PUCCH). For convenience, HARQ ACK/NACK will simply be expressed as ACK/NACK signal. The base station performs HARQ for downlink data indicated as NACK after receiving the ACK/NACK signal. If the base station transmits a plurality of downlink data to the user equipment, the HARQ process can be performed for each transport block corresponding to each of the downlink data.

Figure 5:
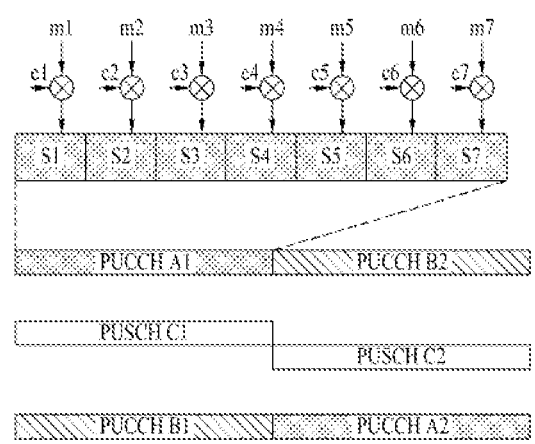
FIG. 5 is a diagram illustrating a structure of an uplink subframe used in an LTE system.

FIG. 5 is a diagram illustrating a structure of an uplink subframe used in an LTE system.

Referring to FIG. 5, the uplink subframe includes a plurality of slots (for example, two slots). The slot can include a different number of SC-FDMA symbols depending on a CP length. For example, in case of a normal CP, the slot includes seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBs) (for example, m=0, 1, 2, 3) located at both ends of the data region on the frequency axis, and is hopped using the slot as a boundary. The control information includes HARQ ACK/NACK, channel quality indicator (CQI), precoding matrix index (PMI), and rank index (RI). Also, the PUSCH and the PUCCH are not transmitted at the same time. The following Table 1 illustrates features PUCCH Format described in 3GPP TS 36.211 Release-8.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
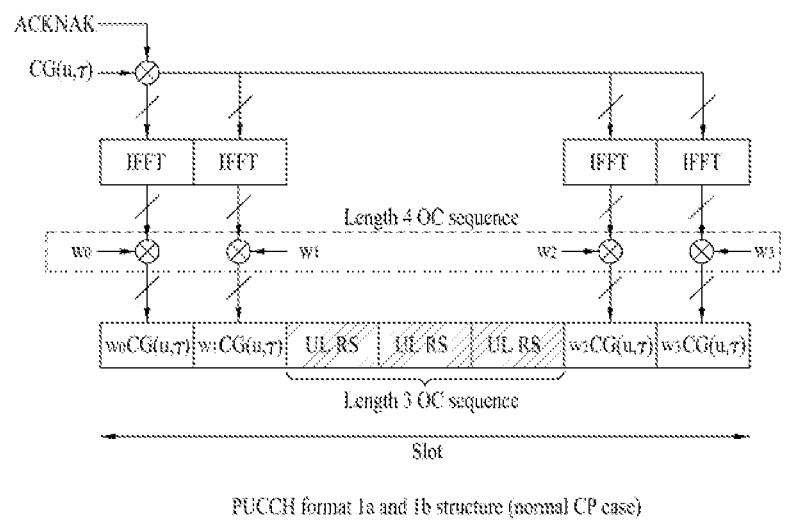
FIG. 6 is a diagram illustrating a structure of a PUCCH for ACK/NACK transmission in an LTE system.

FIG. 6 is a diagram illustrating a structure of a physical uplink control channel (PUCCH) for transmitting ACK/NACK.

Referring to FIG. 6, in case of a normal cyclic prefix (CP), a reference signal (UL RS) is carried in three continuous symbols located in the center of the slot, and control information (i.e., ACK/NACK signals) is carried in the other four symbols. In case of an extended CP, the slot includes six symbols, wherein a reference signal is carried in the third and fourth symbols. ACK/NACK signals from a plurality of user equipments are multiplexed with one PUCCH resource by using a CDM mode. The CDM mode is implemented using (quasi) orthogonal spreading codes for cyclic shift (CS) and/or time spreading of sequences for frequency spreading. For example, the ACK/NACK signals are identified using different cyclic shifts (CS) (frequency spreading) of computer generated constant amplitude zero auto correlation (CG-CAZAC) sequence and/or different Walsh/DFT orthogonal codes (time spreading). w0, w1, w2, w3 multiplied after IFFT obtain the same result even though they are multiplied before IFFT. In the LTE system, PUCCH resources for transmitting ACK/NACK are expressed by combination of (quasi)orthogonal codes for time spreading, location of frequency-time resources (for example, resource block), and cyclic shift of sequences for frequency spreading. Each PUCCH resource is indicated using a PUCCH (resource) index.

Figure 7:
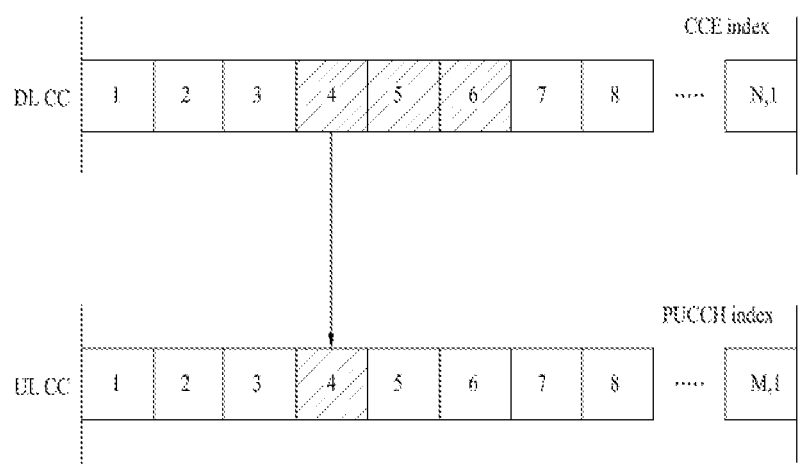
FIG. 7 is a diagram illustrating an example of determining PUCCH resources for ACK/NACK signal transmission.

FIG. 7 is a diagram illustrating an example of determining PUCCH resources for ACK/NACK signal transmission. In the LTE system, PUCCH resources for ACK/NACK are not previously allocated to each user equipment but used by a plurality of user equipments within a cell per timing point. In more detail, the PUCCH resources used for ACK/NACK transmission correspond to PDCCH carrying scheduling information of corresponding downlink data. In each downlink subframe, an entire region where PDCCH is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 7, each square block in a downlink component carrier (DL CC) represents a CCE, and each square block in an uplink component carrier (UL CC) represents a PUCCH resource. Each PUCCH index corresponds to a PUCCH resource for ACK/NACK. It is assumed that PDSCH information is transferred through a PDCCH that includes CCEs Nos. 4 to 6 as illustrated in FIG. 7. In this case, the user equipment transmits ACK/NACK through PUCCH No. 4 corresponding to CCE No. 4 which is the first CCE of the PDCCH. FIG. 6 illustrates that maximum M number of PUCCHs exist in the UL CC when maximum N number of CCEs exist in the DL CC. Although N may be equal to M (N=M), M may be different from N, and mapping between CCEs and PUCCHs may be overlapped.

In more detail, in the LTE system, PUCCH resource index is defined as follows.

$$n^{(1)}_{PUCCH} = n_{CCE} + N^{(1)}_{PUCCH} \quad \text{[Equation 1]}$$

In this case, $n^{(1)}_{PUCCH}$ represents a PUCCH resource index for transmitting ACK/NACK, $N^{(1)}_{PUCCH}$ represents a signaling value transferred from an upper layer, and $n_{CCE}$ represents the smallest value of CCE indexes used for PDCCH transmission.

Figure 8:
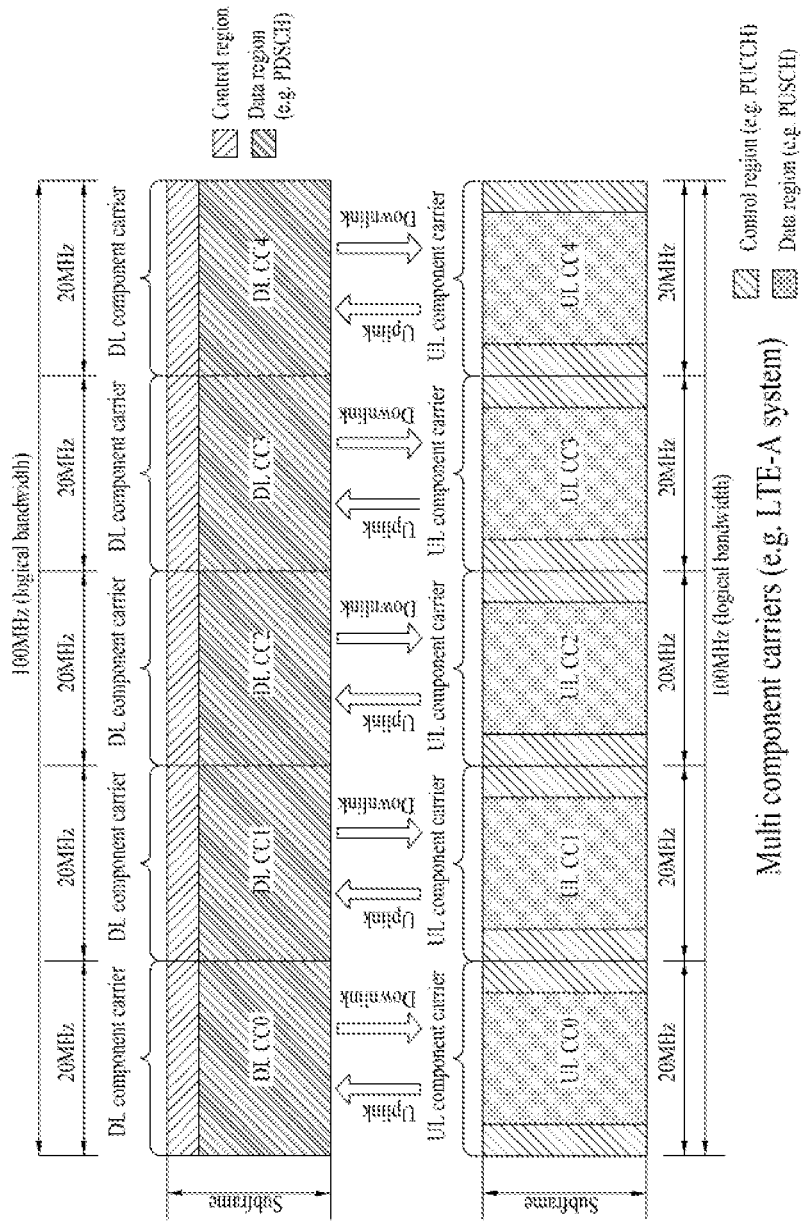
FIG. 8 is a diagram illustrating an example of communication performed under multiple component carriers.

FIG. 8 is a diagram illustrating an example of communication performed under multiple component carriers. FIG. 8 corresponds to a communication example of the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC).

Referring to FIG. 8, five component carriers (CCs) of 20 MHz are collected in the uplink/downlink to support a bandwidth of 100 MHz. The respective CCs may adjoin each other in the frequency domain or not. The radio frame structure illustrated in FIG. 3 can be applied even in the case that multiple component carriers are used. However, since radio frame, subframe and slot are defined in a time unit, the base station and the user equipment can transmit and receive a signal through a plurality of component carriers on one subframe. FIG. 8 illustrates that a bandwidth of each UL CC is the same as and symmetrical to that of each DL CC. However, the bandwidths of the respective component carriers may be defined independently. For example, the bandwidths of the UL CCs may be configured as 5 MHz (UL CC0)+20 MHz (UL CC1)+20 MHz (UL CC2)+20 MHz (UL CC3)+5MHz (UL CC4). Also, asymmetrical carrier aggregation where the number of uplink component carriers is different from the number of downlink component carriers may be configured. The asymmetrical carrier aggregation may occur due to a limit of available frequency bandwidth, or may be configured artificially by network establishment. Also, although an uplink signal and a downlink signal are transmitted through CCs mapped with each other one to one, CC through which a signal is actually transmitted may be varied depending on network establishment or signal type. For example, CC through which scheduling command is transmitted may be different from CC through which data are transmitted in accordance with scheduling command. Also, uplink/downlink control information can be transmitted through a specific UL/DL CC regardless of mapping between CCs.

If the number of UL CCs is, but not limited to, smaller than the number of DL CCs, the user equipment should transmit ACK/NACK for transmission of a plurality of downlink PDSCHs through smaller uplink PUCCHs. In particular, it may be set in such a manner that ACK/NACK for transmission of a plurality of downlink PDSCHs is transmitted through a specific UL CC only. Also, if the number of UL CCs is the same as the number of DL CCs and the user equipment uses MIMO (Multiple Input Multiple Output) or is operated in accordance with the TDD mode, the user equipment receives a plurality of transport blocks. In this case, the user equipment should transmit ACK/NACK signals for a plurality of data units through the limited PUCCH resource.

Meanwhile, in the LTE system according to the related art, PUCCH resources are repeated within a subframe in a slot unit, and ACK/NACK signals having the same value are transmitted through each slot. Repetition of the PUCCH resources defined in the LTE system is to enhance reliability of ACK/NACK signals through time/frequency diversity. However, information of ACK/NACK signals that can be transmitted at once is reduced in proportion to the number of repetition times of the PUCCH resources.

Hereinafter, the present invention suggests that ACK/NACK signals are transmitted efficiently to correspond to transport blocks received through a plurality of component carriers in the LTE-A system to which carrier aggregation is applied. Also, in the present invention, it is assumed that ACK/NACK signals corresponding to transport blocks received through a plurality of downlink component carriers are transmitted through one uplink component carrier.

<Extension of PUCCH Format 1>

Generally, in PUCCH Format 1 system, the maximum number of ACK/NACK signals that can be transmitted is determined depending on modulation order. For example, one ACK/NACK signal can be transmitted in case of BPSK while two ACK/NACK signals can be transmitted in case of QPSK. Hereinafter, a method for transmitting ACK/NACK signals for transport blocks transmitted through a plurality of component carriers by extending the PUCCH Format 1 shown in Table 1 will be described.

Figure 9:
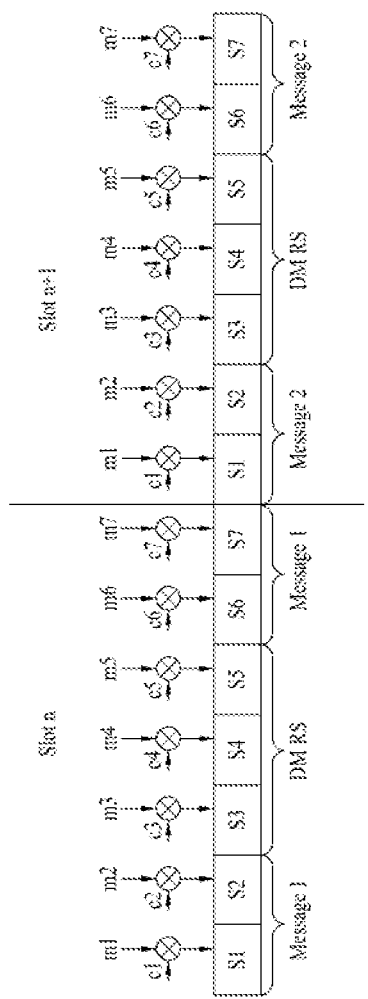
FIG. 9 is a diagram illustrating a PUCCH Format 1 extension scheme according to one embodiment of the present invention.

FIG. 9 is a diagram illustrating a PUCCH Format 1 extension scheme according to one embodiment of the present invention.

Referring to FIG. 9, in the present invention, PUCCH resources are allocated to ACK/NACK signals per slot to. This will be referred to as slot division. According to the slot division, PUCCH resources repeated per slot within a subframe can be used independently during ACK/NACK signal transmission. In other words, the PUCCH resources repeated per slot within a subframe are subjected to decoupling during ACK/NACK signal transmission. Accordingly, the PUCCH resources for transmitting the ACK/NACK signals can be selected independently based on the slot.

Also, modulation order may be set per slot to flexibly control the number of ACK/NACK signals that can be transmitted through one slot. The following Table 2 illustrates an example of a PUCCH Format 1 extension scheme according to the number of downlink component carriers if the base station is not operated in a MIMO mode, i.e., if only one transport block is received through one downlink component carrier.

TABLE 2

ACK/NACK count; x = # of A/Ns

| Single Tx/Diversity | SM with n resources | PUCCH format |
|---|---|---|
| 1 | Ceil{x/n} <= 1 | Rel-8 PUCCH |
| 2 | Ceil{x/n} <= 2 | Rel-8 PUCCH |
| 3 | Ceil{x/n} <= 3 | Slot division with one of two slots having QPSK |
| 4 | Ceil{x/n} <= 4 | Slot division with two slots having QPSK |
| 5 | Ceil{x/n} <= 5 | Slot division with one of two slots having 8PSK |

In Table 2, Ceil{x/n} means a rounded off value of x/n, x means a total number of ACK/NACK signals to be transmitted, and n means the number of PUCCH resources that can be allocated for independent ACK/NACK signal transmission.

Meanwhile, if the base station can transmit ACK/NACK signals to two transport blocks through one component carrier as the MIMO mode is applied to the base station, the scheme of Table 2 is needed to be corrected. The following Table 3 illustrates a corrected example of the Table 2.

TABLE 3

ACK/NACK count; x = # of A/Ns

| SingleTx/Diversity | SM with n resources | PUCCH format |
|---|---|---|
| ~2 | Ceil{x/n} <= 2 | Rel-8 PUCCH |
| ~4 | Ceil{x/n} <= 4 | Slot division with two slots having QPSK |
| ~6 | Ceil{x/n} <= 6 | Slot division with two slots having 8PSK |
| ~8 | Ceil{x/n} <= 8 | A. Slot division with two slots having 16 QAM( or PSK)<br>B. Bundling can be used among spatial domain or carrier domain; Limit the modulation order to 8PSK or QPSK with slot division |
| ~10 | Ceil{x/n} <= 10 | A. Slot division with two slots having 32 QAM( or PSK)<br>B. Slot division with one of two slots having 64QAM<br>C. Bundling can be used among spatial domain or carrier domain; Limit the modulation order to 8PSK or QPSK with slot division |

As illustrated in Table 3, the number of ACK/NACK signals transmitted per slot is uniformly maintained or its difference is minimized, whereby modulation order used in each slot is set at a low level as low as possible.

As another PUCCH Format 1 extension scheme, it is set in such a manner that hopping between slots is not performed. For example, it means that PUCCH A1 and PUCCH B3 of FIG. 5 are used as one PUCCH resource. According to the PUCCH Format 1 extension scheme, as same resource block is used as the PUCCH resource, channel response is not varied rapidly in the frequency domain. In this case, a separate modulation scheme may be applied to each slot, whereby additional ACK/NACK signals can be defined. Namely, different modulation schemes can be applied to a reference signal (DM-RS) part of the first slot and a reference signal (DM-RS) part of the second slot, and separately from ACK/NACK message transmitted to each slot, another ACK/NACK message can be transmitted to the reference symbol.

Also, as another method in addition to the slot division scheme, the resource used by the first message or the second message of FIG. 9 is subdivided based on the PUCCH DM-RS applied to each slot, whereby independent message can be transmitted. At this time, a length of a cover sequence in the time domain can be reduced to half.

<Extension of PUCCH Format 2>

As an example of a method for transmitting ACK/NACK information using PUCCH format 2 system, there may be considered a method for mapping ACK/NACK information for each transport block into OFDM symbol without spreading of a time domain after performing coding and modulation for the ACK/NACK information. Also, there may be considered a method for transmitting a plurality of ACK/NACK information to payload of PUCCH format 2. Hereinafter, the above two methods will be described in detail.

Figure 10:
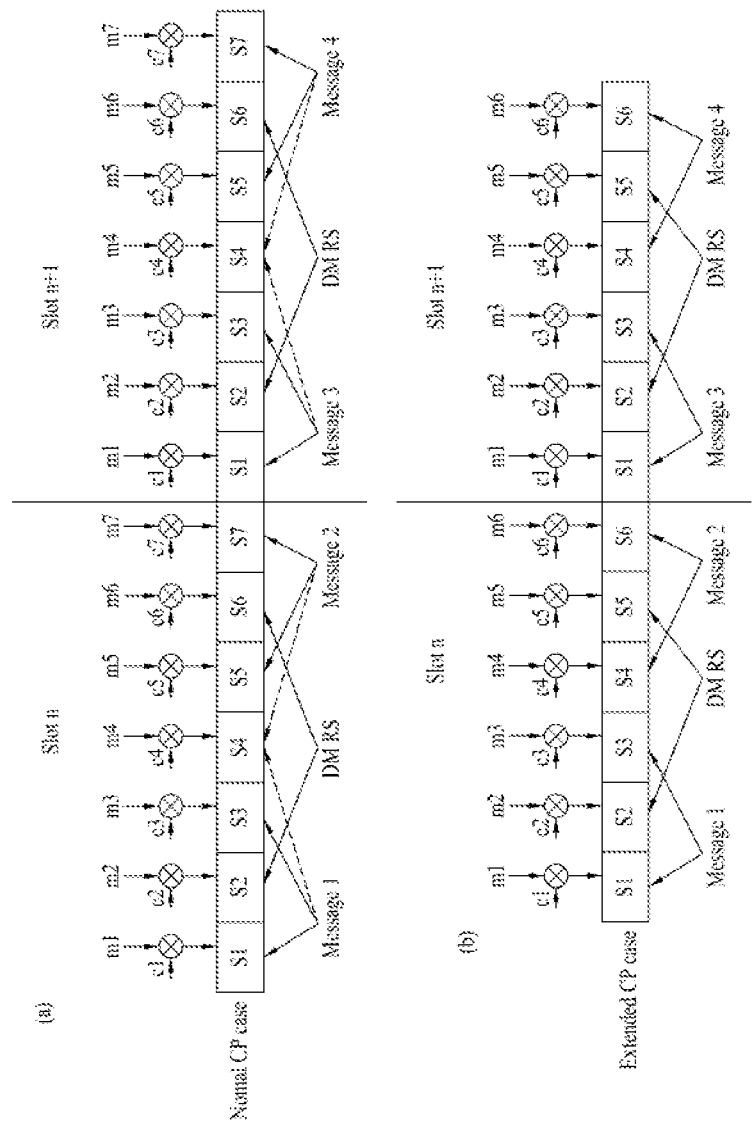
FIG. 10 is a diagram illustrating a PUCCH Format 2 extension scheme according to one embodiment of the present invention.

First of all, the first method will be described. FIG. 10 is a diagram illustrating a PUCCH Format 1 extension scheme according to one embodiment of the present invention. In particular, it is noted that (a) of FIG. 10 illustrates that normal CP is applied while (b) of FIG. 10 illustrates that extended CP is applied.

Referring to FIG. 10, four messages are used as resources that can transmit maximum two kinds of ACK/NACK information as QPSK is applied. Particularly, in (a) of FIG. 10, symbol S4 can be used if the first message and the third message are transmitted or if the second message and the fourth message are transmitted. If the messages are transmitted using three symbols, detection throughput is improved. The symbols can be used for modulation scheme of higher order or to set priority of ACK/NACK messages.

The following Table 4 illustrates an example of a PUCCH Format 2 extension scheme if MIMO mode is not used.

TABLE 4

ACK/NACK count; x = # of A/Ns

| Single Tx/Diversity | SM with n resources | PUCCH format |
|---|---|---|
| 1 | Ceil{x/n} <= 1 | Rel-8 PUCCH format 1 |
| 2 | Ceil{x/n} <= 2 | Rel-8 PUCCH format 2 |
| 3 | Ceil{x/n} <= 3 | PUCCH format 2 extension:<br>A. Two messages among four messages are the same ACK/NACK information.<br>B. One message have QPSK and the other three message with BPSK |
| 4 | Ceil{x/n} <= 4 | PUCCH format 2 extension:<br>A. Each message have BPSK modualtion with one ACK/NACK<br>B. Message1 = Message2 and Message3 = Message4, where QPSK modulation is used for each slot |
| 5 | Ceil{x/n} <= 5 | PUCCH format 2 extension:<br>One of four messages has QPSK modulation and the others have BPSK modulation for ACK/NACK transmission |

The following Table 5 illustrates an example of a PUCCH Format 2 extension scheme if MIMO mode is not used.

TABLE 5

ACK/NACK count; x = # of A/Ns

| Single Tx/Diversity | SM with n resources | PUCCH format |
|---|---|---|
| ~2 | Ceil{x/n} <= 2 | Rel-8 PUCCH |
| ~4 | Ceil{x/n} <= 4 | PUCCH format 2 extension: Each A/N can be located on each message with BPSK |
| ~6 | Ceil{x/n} <= 6 | PUCCH format 2 extension: two messages can have QPSK modualtion and the other two message can have BPSK |

TABLE 5-continued

ACK/NACK count;
x = # of A/Ns

| Single Tx/ Diversity | SM with n resources | PUCCH format |
|---|---|---|
| ~8 | Ceil{x/n} <= 8 | PUCCH format 2 extension: Each A/N can be located on each message with QPSK |
| ~10 | Ceil{x/n} <= 10 | PUCCH format 2 extension: two messages can have 8PSK modulation and the other two message can have QPSK |

Figure 11:
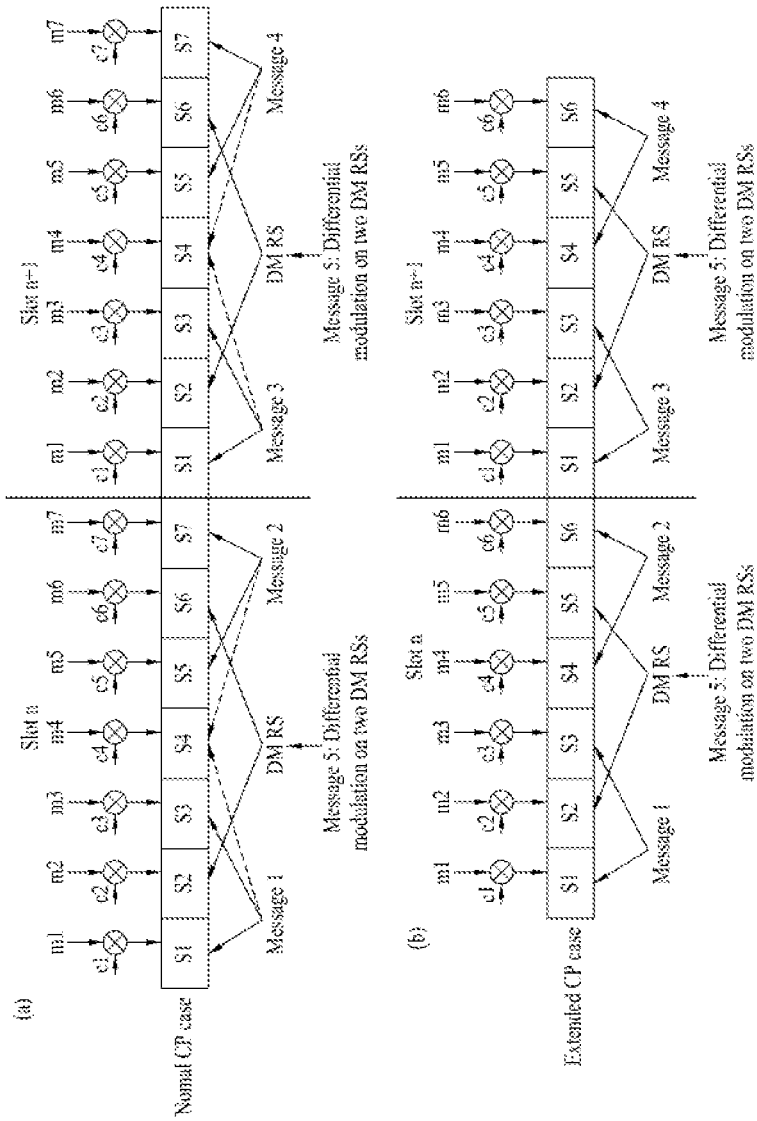
FIG. 11 is a diagram illustrating a PUCCH Format 2 extension scheme according to another embodiment of the present invention.

FIG. 11 is a diagram illustrating a PUCCH Format 2 extension scheme according to another embodiment of the present invention. In particular, in the PUCCH Format 2 extension scheme of FIG. 11, reference symbols are used.

Unlike the PUCCH Format 1 extension scheme in which reference symbols are spread into the time domain using spreading sequence, in the PUCCH Format 2 extension scheme, reference symbols are neither spread nor modulated using any information except that CQI and ACK/NACK are transmitted together or CIQ and SR are transmitted together. Accordingly, a different modulation scheme for each slot can be applied to the reference symbols to message the fifth message, whereby ACK/NACK information is transmitted using the fifth message.

If the ACK/NACK information is transmitted using the fifth message, the Table 4 and the Table 5 can be simplified as illustrated in the following Table 6 and Table 7.

TABLE 6

ACK/NACK count;
x = # of A/Ns

| Single Tx/ Diversity | SM with n resources | PUCCH format |
|---|---|---|
| 1 | Ceil{x/n} <= 1 | Rel-8 PUCCH format 1 |
| 2 | Ceil{x/n} <= 2 | Rel-8 PUCCH format 1 |
| 3 | Ceil{x/n} <= 3 | PUCCH format 2 extension: Message 5 is not used<br>A. Two messages among four messages are the same ACK/NACK information.<br>B. One message have QPSK and the other three message with BPSK |
| 4 | Ceil{x/n} <= 4 | PUCCH format 2 extension: Message 5 is not used<br>A. Each message have BPSK modulation with one ACK/NACK<br>B. Message1 = Message2 and Message3 = Message4, where QPSK modulation is used for each slot |
| 5 | Cell{x/n} <= 5 | PUCCH format 2 extension: Each message have BPSK modulation |

TABLE 7

ACK/NACK count;
x = # of A/Ns

| Single Tx/ Diversity | SM with n resources | PUCCH format |
|---|---|---|
| ~2 | Ceil {x/n} <= 2 | Rel-8 PUCCH |
| ~4 | Ceil {x/n} <= 4 | PUCCH format 2 extension: Message5 is not used, Each A/N can be located on for messages with BPSK |

TABLE 7-continued

ACK/NACK count;
x = # of A/Ns

| Single Tx/ Diversity | SM with n resources | PUCCH format |
|---|---|---|
| ~6 | Ceil {x/n} <= 6 | PUCCH format 2 extension: Message5 is not used, two messages can have QPSK modulation and the other two message can have BPSK |
| ~8 | Ceil {x/n} <= 8 | PUCCH format 2 extension: Message5 is not used, Each A/N can be located on four messages with QPSK |
| ~10 | Ceil {x/n} <= 10 | PUCCII format 2 extension: Five messages can have QPSK modulation |

The method for transmitting separate ACK/NACK information through first to fifth messages has been described as above. Hereinafter, a method for transmitting a plurality of ACK/NACK information to payload of PUCCH format 2 will be described.

Generally, PUCCH format 2 transmits 21 bits for CQI transmission, PUCCH format 2a transmits 21 bits for CQI+A/N(1 bit) transmission, PUCCH format 2b transmits 22 bits for CQI+A/N(2 bits) transmission. This is based on the number of coded bits which have been channel coded. Payload size of the PUCCH format 2 is 13 bits. Accordingly, if maximum payload of 13 bits of the PUCCH format 2 is used, a plurality of ACK/NACK information can be transmitted.

It is assumed that frequency aggregation is used. In this case, ACK/NACK information of 1 bit is transmitted to correspond to transport blocks received through each downlink component carrier, the number of bits of required ACK/NACK information is determined depending on the number of transport blocks through one component carrier. In other words, if one transport block is received through one component carrier, i.e., if MIMO transmission is not applied, since the user equipment transmits ACK/NACK information of 1 bit for each transport block, (2×Ncc) ACK/NACK bits are required.

FIG. 12 is a diagram illustrating a method for allocating a plurality of ACK/NACK information to payload of PUCCH format 2 in accordance with one embodiment of the present invention.

Referring to FIG. 12, the user equipment generates containers for transmitting the plurality of ACK/NACK information in due order depending on downlink component carrier index when generating payload using PUCCH format 2. In this case, if a plurality of transport blocks are received through at least one downlink component carrier among the plurality of downlink component carriers, containers for containing ACK/NACK information are generated in due order depending on the order of transport blocks received through the at least one downlink component carrier. Even if separate MIMO mode is applied to each downlink component carrier, the user equipment generates containers for containing ACK/NACK information in due order depending on downlink component carrier index and the order of transport blocks.

However, the base station should signal the type of container for containing ACK/NACK information to the user equipment, and can use dynamic indication through PDCCH or semi-static indication through upper layer, for example, RRC layer, as a signaling method.

As shown in FIG. 12, ACK/NACK information is contained in some of maximum 13 bits, and the other remaining bits of 13 bits are not used. This is to use a channel coding scheme of the related art as a channel coding scheme for transmitting A/N information using the PUCCH format 2 of the present invention. Accordingly, the channel coding scheme of the PUCCH format 2 uses a (20, A) block coding scheme. Also, even if a plurality of kinds of ACK/NACK information is transmitted using the PUCCH format 2, QPSK is used as the modulation scheme, whereby the channel coding scheme of the related art can be used.

Meanwhile, as a channel coding scheme for transmitting a plurality of kinds of ACK/NACK information using PUCCH format 2, a simple repetition coding scheme may be used instead of the (20, A) block coding scheme. In this case, after repeated coding for each of ACK/NACK information, the ACK/NACK information may be contained in the container and then mapped into the PUCCH format 2. Alternatively, after the ACK/NACK information is contained in the container, repeated coding may be performed for the ACK/NACK information and then mapped into the PUCCH format 2.

Meanwhile, scheduling information of downlink data transmission is transmitted through the PDCCH. If the PDCCH is transmitted using joint coding, since scheduling grant of all downlink component carriers is transmitted using one payload, a problem that scheduling information of a random downlink component carrier is not received does not occur. However, if the PDCCH is transmitted by containing scheduling information for each component carrier using separate coding, a problem that scheduling grant of a random component carrier is not received may occur. In this case, DTX occurs in ACK/NACK transmission for data transmission of the corresponding component carrier. Accordingly, if scheduling grant is transmitted using separate coding, DTX as well as ACK/NACK corresponding to data transmission associated with scheduling grant which is not received should be considered. Hereinafter, a method for transmitting ACK/NACK information including DTX to PUCCH format 2 will be described.

Examples of a method for feeding DTX back include a method for explicitly transmitting ACK/NACK/DTX of each downlink component carrier and a method for transmitting ACK/NACK/DTX by mapping several states of ACK/NACK/DTX, which may occur in a plurality of downlink component carriers, into bit index. Each method is divided into non-MIMO transmission (single TB) and MIMO transmission (multiple TB, SM).

First of all, the method for explicitly transmitting ACK/NACK/DTX of each downlink component carrier will be described.

If the base station does not perform MIMO transmission, i.e., for one transport block transmitted from each downlink component carrier, three states of ACK/NACK/DTX occur. In this case, in order to express three states for each component carrier, 2 bits are required. Accordingly, in order to indicate each of ACK/NACK/DTX information of each component carrier, (2×Ncc) bits are required. In other words, if the number of maximum component carriers is five, maximum 10 bits are transmitted through payload of PUCCH format 2. FIG. 13 is a diagram illustrating a method for transmitting a plurality of kinds of ACK/NACK/DTX information to payload of PUCCH format 2 in accordance with one embodiment of the present invention.

Unlike FIG. 13, a method for coding and mapping ACK/NACK/DTX information corresponding to transport blocks transmitted through each component carrier into OFDM symbols may be provided. In other words, 2 bits required to express ACK/NACK/DTX information for each component carrier can be transmitted to the message part of FIG. 10 by using the QPSK modulation scheme.

If the base station performs MIMO transmission, to express ACK/NACK/DTX information for a plurality of transport blocks transmitted from each downlink component carrier, one state of ACK/NACK and DTX for each transport block exists. In the LTE system, since two transport blocks are transmitted from one component carrier, a total of five states occur. To express these states, 3 bits are required. In order to indicate ACK/NACK/DTX information for each downlink component carrier, (3×Ncc) bits are required. In other words, if the number of maximum downlink component carriers is five, maximum 15 bits are divided into five parts of 3 bits each and then should be transmitted through payload of PUCCH format 2. However, since size of payload that can be transmitted using PUCCH format 2 is maximum 13 bits as described above, the base station can transmit maximum 13 bits only in case of MIMO transmission.

Figure 14:
FIG. 14 is a diagram illustrating a method for transmitting ACK/NACK/DTX information in accordance with one embodiment of the present invention when a base station is operated in a MIMO mode and the number of downlink component carriers is less than 4.

Accordingly, if the number of downlink component carriers is less than 4, ACK/NACK/DTX information for each downlink component carrier is divided like that the base station does not perform MIMO transmission. FIG. 14 is a diagram illustrating a method for transmitting ACK/NACK/DTX information in accordance with one embodiment of the present invention when a base station is operated in a MIMO mode and the number of downlink component carriers is less than 4.

Although ACK/NACK/DTX information of each downlink component carrier is mapped into payload of PUCCH format 2 in FIG. 14, a method for coding and modulating ACK/NACK/DTX information corresponding to transport blocks transmitted through each downlink component carrier and mapping the ACK/NACK/DTX information into OFDM symbols may be used. In other words, 3 bits required to express ACK/NACK/DTX information for each downlink component carrier can be transmitted to the message part of FIG. 10 by using the 8PSK modulation scheme.

Figure 15:
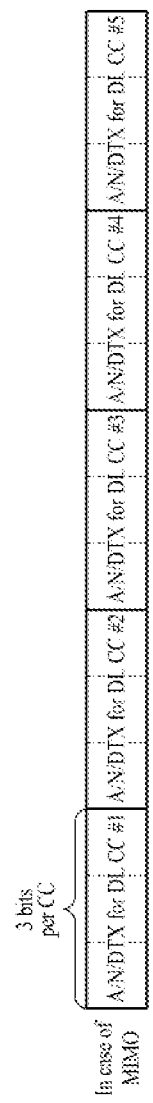
FIG. 15 is a diagram illustrating a method for transmitting ACK/NACK/DTX information in accordance with one embodiment of the present invention when a base station is operated in a MIMO mode and the number of downlink component carriers is more than 5.

If the number of downlink component carriers is five or more, PUCCH format 2b is used. FIG. 15 is a diagram illustrating a method for transmitting ACK/NACK/DTX information in accordance with one embodiment of the present invention when a base station is operated in a MIMO mode and the number of downlink component carriers is more than 5.

Figure 1:
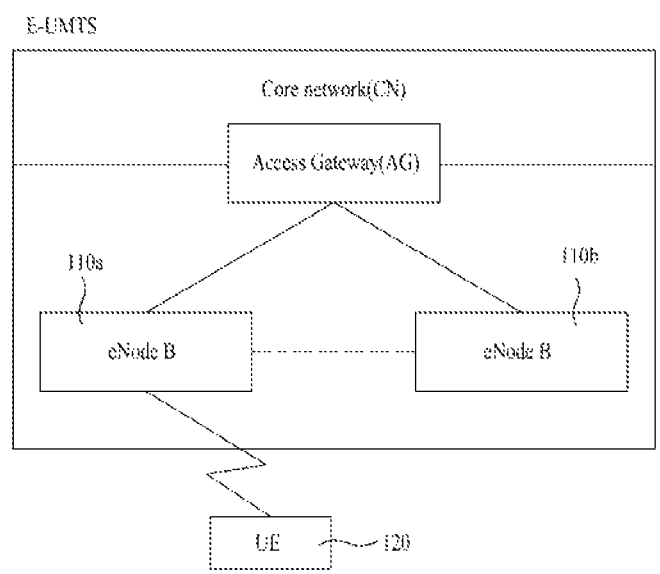
FIG. 1 is a diagram illustrating a network structure of an Evolved Universal Mobile Telecommunications System (E-UMTS) which is an example of a mobile communication system.

Referring to FIG. 15, ACK/NACK/DTX information corresponding to four component carriers use CQI payload as illustrated in FIG. 14, and 1 bit of 3 bits for expressing ACK/NACK/DTX information corresponding to the last component carrier is allocated to the other 1 bit of CQI payload, and 2 bits for transmitting ACK/NACK from PUCCH format 2b are used.

Figure 16:
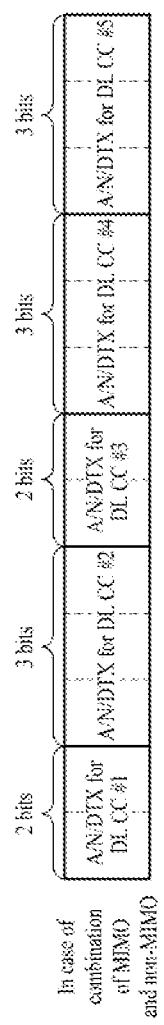
FIG. 16 is a diagram illustrating a case where component carriers 1 and 3 are operated in a Non-MIMO mode and the other component carriers are operated in a MIMO mode.

Meanwhile, in the LTE-A system, a transmission mode for each downlink component carrier can be defined. Accordingly, bits for transmitting ACK/NACK/DTX information can be defined for each component carrier. FIG. 16 is a diagram illustrating a method for transmitting ACK/NACK/DTX information in accordance with one embodiment of the present invention if a base station varies MIMO transmission for each downlink component carrier. In particular, FIG. 16 illustrates that component carriers 1 and 3 are operated in a Non-MIMO mode and the other component carriers are operated in a MIMO mode.

Next, the method for transmitting ACK/NACK/DTX by mapping several states of ACK/NACK/DTX, which may occur in a plurality of downlink component carriers, into bit index will be described.

First of all, if the base station does not perform MIMO transmission, 3^Ncc number of states may occur as ACK/NACK/DTX information. The number of states that can occur depending on the number of component carriers and bits required to express the states are illustrated in Table 8 below. Also, Table 9 illustrates an example of ACK/NACK/DTX information expressed depending on the above method.

TABLE 8

| # of DL CCs | # of ACK/NACK/DTX status combination (A, B, C)*, where A, B, C in{ACK, NACK, DTX} and * means multiplicative combination extension | # of bits required |
|---|---|---|
| 1 | 3 | 2 |
| 2 | 9 | 4 |
| 3 | 27 | 5 |
| 4 | 81 | 7 |
| 5 | 243 | 8 |

Note:
the order of A, B, C may be varied

TABLE 9

| # of DL CCs | A/N/DTX state | | | Bit representation |
|---|---|---|---|---|
| 1 | ACK | | | 00 |
| | NACK | | | 01 |
| | DTX | | | 10 |
| | None (or reserved) | | | 11 |
| 2 | ACK | ACK | | 0000 |
| | ACK | NACK | | 0001 |
| | ACK | DTX | | 0010 |
| | NACK | ACK | | 0011 |
| | NACK | NACK | | 0100 |
| | NACK | DTX | | 0101 |
| | DTX | ACK | | 0110 |
| | DTX | NACK | | 0111 |
| | DTX | DTX | | 1000 |
| | None (or reserved) | | | 1001 |
| | None (or reserved) | | | 1010 |
| | None (or reserved) | | | 1011 |
| | None (or reserved) | | | 1100 |
| | None (or reserved) | | | 1101 |
| | None (or reserved) | | | 1110 |
| | None (or reserved) | | | 1111 |
| 3 | ACK | ACK | ACK | 00000 |
| | ACK | ACK | NACK | 00001 |
| | ACK | ACK | DTX | 00010 |
| | ACK | NACK | ACK | 00011 |
| | ACK | NACK | NACK | 00100 |
| | ACK | NACK | DTX | 00101 |
| | ACK | DTX | ACK | 00110 |
| | ACK | DTX | NACK | 00111 |
| | ACK | DTX | DTX | 01000 |
| | NACK | ACK | ACK | 01001 |
| | NACK | ACK | NACK | 01010 |
| | NACK | ACK | DTX | 01011 |
| | NACK | NACK | ACK | 01100 |
| | NACK | NACK | NACK | 01101 |
| | NACK | NACK | DTX | 01110 |
| | NACK | DTX | ACK | 01111 |
| | NACK | DTX | NACK | 10000 |
| | NACK | DTX | DTX | 10001 |
| | DTX | ACK | ACK | 10010 |
| | DTX | ACK | NACK | 10011 |
| | DTX | ACK | DTX | 10100 |
| | DTX | NACK | ACK | 10101 |
| | DTX | NACK | NACK | 10110 |
| | DTX | NACK | DTX | 10111 |
| | DTX | DTX | ACK | 11000 |
| | DTX | DTX | NACK | 11001 |
| | DTX | DTX | DTX | 11010 |
| | None (or reserved) | | | 11011 |
| | None (or reserved) | | | 11100 |
| | None (or reserved) | | | 11101 |
| | None (or reserved) | | | 11110 |
| | None (or reserved) | | | 11111 |

Note:
if the number of DL CCs is more than 1, each row of this cell represents A/N/DTX state of each DL CC Although the number of component carriers is 3 in Table 9, even if the number of component carriers is 4 or more, extension can be performed in the same manner as Table 9. Meanwhile, these bit indexes can be transmitted through payload of PUCCH format 2. In this case, the same scheme as that of the related art in which CQI is transmitted can be used as a channel coding and modulation scheme.

If the base station performs MIMO transmission, $5^{Ncc}$ number of states may occur. The number of states that can occur depending on the number of component carriers and bits required to express the states are illustrated in Table 10 below. Also, Table 11 illustrates an example of ACK/NACK/DTX information expressed depending on the above method.

TABLE 10

| # of DL CCs | # of ACK/NACK/DTX status combination (A, B, C, D, E)*, where A, B, C in {ACK, NACK, ACK, NACK, DTX} and * means multiplicative combination extension | # of bits required |
|---|---|---|
| 1 | 5 | 3 |
| 2 | 25 | 5 |
| 3 | 125 | 7 |
| 4 | 625 | 10 |
| 5 | 3125 | 12 |

Note:
the order of A,B,C may be varied

TABLE 11

| # of DL CCs | A/N/DTX/ state | | Bit representation | |
|---|---|---|---|---|
| 1 | TB 1 | TB 2 | | |
|   | ACK | ACK | 000 | |
|   | ACK | NACK | 001 | |
|   | NACK | ACK | 010 | |
|   | NACK | NACK | 011 | |
|   | DTX | | 100 | |
|   | None (or reserved) | | 101 | |
|   | None (or reserved) | | 110 | |
|   | None (or reserved) | | 111 | |
|   | DL CC 1 | | DL CC 2 | |
|   | TB 1 | TB 2 | TB 1 | TB 2 |
|   | ACK | ACK | ACK | ACK | 00000 |
|   | ACK | ACK | ACK | MACK | 00001 |
|   | ACK | ACK | NACK | ACK | 00010 |
|   | ACK | ACK | NACK | NACK | 00011 |
|   | ACK | NACK | ACK | ACK | 00100 |
|   | ACK | NACK | ACK | NACK | 00101 |
|   | ACK | NACK | HACK | ACK | 00110 |
|   | ACK | NACK | NACK | NACK | 00111 |
|   | NACK | ACK | ACK | ACK | 01000 |
|   | NACK | ACK | ACK | NACCK | 01001 |
|   | NACK | ACK | NACK | ACK | 01010 |
|   | NACK | ACK | NACK | NACK | 01011 |
|   | NACK | NACK | ACK | ACK | 01100 |
|   | NACK | NACK | ACK | NACK | 01101 |
|   | NACK | NACK | NACK | ACK | 01110 |
|   | NACK | NACK | NACK | NACK | 01111 |
|   | ACK | ACK | DTX | | 10000 |
|   | ACK | NACK | DTX | | 10001 |
|   | NACK | ACK | DTX | | 10010 |
|   | NACK | NACK | DTX | | 10011 |
|   | DTX | ACK | CK | | 10100 |
|   | DTX | ACK | NACK | | 10101 |
|   | DTX | NACK | ACK | | 10110 |
|   | DTX | NACK | NACK | | 10111 |
|   | DTX | | 11000 | |
|   | None (or reserved) | | 11001 | |
|   | None (or reserved) | | 11010 | |
|   | None (or reserved) | | 11011 | |
|   | None (or reserved) | | 11100 | |
|   | None (or reserved) | | 11101 | |
|   | None (or reserved) | | 11110 | |
|   | None (or reserved) | | 11111 | |

Likewise, although the number of component carriers is 2 in Table 11, even if the number of component carriers is 3 or more, extension can be performed in the same manner as Table 11. Meanwhile, these bit indexes can be transmitted through payload of PUCCH format 2. In this case, the same scheme as that of the related art in which CQI is transmitted can be used as a channel coding and modulation scheme.

Meanwhile, a transmission mode may be defined for each component carrier. In this case, ACK/NACK/DTX information that can occur for each component carrier can become three states or five states. These two types of states may be used together, or the three states may be added to the five states.

For example, if all downlink component carriers use non-MIMO transmission mode, transmission is performed depending on definition of Table 9. If any one or more downlink component carriers are defined in a MIMO transmission mode, bit index mapping of all downlink component carriers is defined depending on Table 11. In this case, in case of non-MIMO transmission mode, for mapping, three states should be converted to five states. In this case, conversion can be performed in such a manner as DTX→DTX, ACK→ACK/ACK and NACK→NACK/NACK.

Unlike this, since a transmission mode and setup information of each downlink component carrier can be sued by the user equipment, the method for transmitting ACK/NACK/DTX by performing bit index mapping for each downlink component carrier and performing joint coding may be considered.

Hereinafter, a method for allocating resources when ACK/NACK information is transmitted using PUCCH format 2 will be described. First of all, the base station can directly indicate whether to use PUCCH format 2 for ACK/NACK information transmission through upper layer, for example, RRC layer.

Alternatively, the base station may indirectly indicate information of dedicated resource allocation for PUCCH format 2 through RRC layer. For example, the base station may indicate that PUCCH format 2 can be used in a specific component carrier, or may forward a value designating location of dedicated resource used by PUCCH format 2 or a parameter related to the value. The other resources mapped into PUCCH format 2 and PUCCH format 1 of the LTE system can be used as the PUCCH format 2 dedicated resources for ACK/NACK information transmission within an uplink component carrier.

Figure 17:
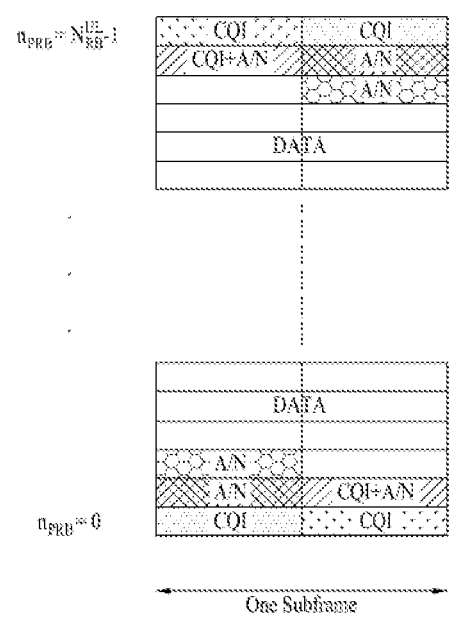
FIG. 17 is a diagram illustrating a method for allocating PUCCH format 2 dedicated resources according to one embodiment of the present invention.

FIG. 17 is a diagram illustrating a method for allocating PUCCH format 2 dedicated resources according to one embodiment of the present invention. As shown in FIG. 17, in LTE Rel-8 PUCCH, PUCCH format 2 that transmits CQI is located at the edge of RB, PUCCH format 2a or PUCCH format 2b that transmits CQI+ACK/NACK is located next to the edge, and ACK/NACK is mapped into the PUCCH format 2a or the PUCCH format 2b. For compatibility with the related art system, PUCCH format 2 for ACK/NACK transmission of the present invention is transmitted to next part to a resource to which Rel-8 PUCCH is transmitted.

Figure 18:
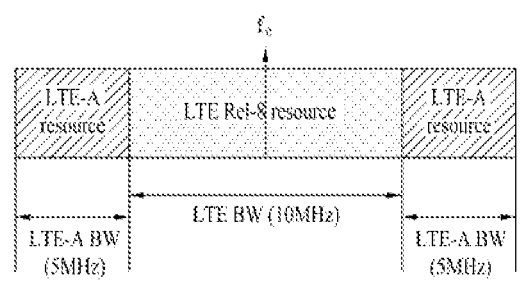
FIG. 18 is a diagram illustrating an example of using PUCCH format 2 dedicated resources allocated as resources for LTE-A in accordance with one embodiment of the present invention.

Meanwhile, if there is resource allocated for LFE-A, PUCCH format 2 for ACK/NACK transmission may be transmitted from the corresponding part only. FIG. 18 is a diagram illustrating an example of using a PUCCH format 2 dedicated resource allocated as a resource for LTE-A in accordance with one embodiment of the present invention.

Also, PUCCH format 2 for existing CQI resource may be used again instead of allocating the dedicated resource. In this case, a PUCCH allocation scheme for transmitting CQI or CQI+ACK/NACK can be used.

Hereinafter, another method for transmitting ACK/NACK information will be described.

Figure 19:
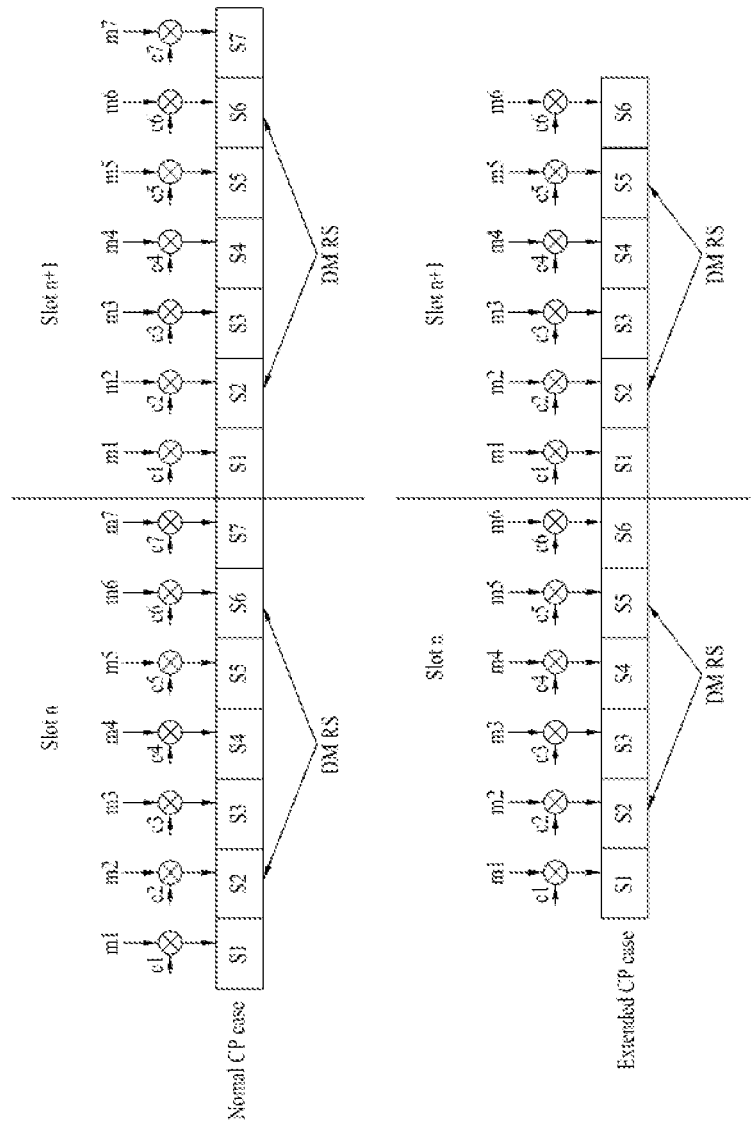
FIG. 19 is a diagram illustrating another method for transmitting ACK/NACK information in accordance with one embodiment of the present invention.

FIG. 19 is a diagram illustrating another method for transmitting ACK/NACK information in accordance with one embodiment of the present invention. In particular, unlike FIG. 10 or FIG. 11, FIG. 19 illustrates that message pairing is not applied.

Referring to FIG. 19, each OFDM symbol can be used to transmit ACK/NACK information of one component carrier. OFDM symbols for reference signal transmission will be excluded.

In case of normal CP, since two OFDM symbols (S2 and S6) per slot are used as reference symbols, the other OFDM symbols can be used data symbols for transmitting ACK/NACK information. If one reference symbol per slot is used, S4 can be used as a reference symbol and the other six data symbols can be used to transmit ACK/NACK information.

In case of extended CP, two reference symbols per slot may be used, or one reference symbol per slot may be used. Likewise, the other data symbols except for the reference symbols can be used to transmit ACK/NACK information.

Each of the symbols for transmitting ACK/NACK information can be used as a PUCCH corresponding to one downlink component carrier. For example, when the user equipment should transmit ACK/NACK signals of N number of downlink component carriers, the user equipment can map downlink component carriers in due order by starting from S1. For example, it is assumed that ACK/NACK signals for five downlink component carriers are transmitted. In case of normal CP, the user equipment can map ACK/NACK signal of each downlink component carrier into five data symbols of the first slot.

If the number of downlink component carriers for ACK/NACK information transmission is more than the number of data symbols that can be transmitted from one slot, symbols from a neighboring slot can be used additionally as much as wanted symbols regardless of hopping.

In this case, one data symbol transmits ACK/NACK information of one component carrier through a specific modulation scheme (BPSK, QPSK, 8PSK, or 16QAM). The data symbols may be mapped in due order depending on component carrier indexes or in a type of constant offset.

In one subframe, remaining data symbols, i.e., data symbols, which have been used during the first ACK/NACK signal transmission, can repeatedly be allocated to ACK/NACK information. The mapping order of data symbols and the mapping order of ACK/NACK information can be varied. In this case, masking sequence such as walsh code, DFT, ZC sequence, and m-sequence can be applied between the repeated symbols, whereby spreading gain can be obtained.

Meanwhile, if repetition of ACK/NACK information of a specific component carrier is greater than repetition of ACK/NACK information of another component carrier, the ACK/NACK information repeated for the specific component carrier can be subjected to truncation in due order which is previously defined.

The number of component carriers which should transmit ACK/NACK information can be defined depending on the number of component carriers specified by the user equipment. However, how much ACK/NACK information should be transmitted can be notified directly by scheduling grant. Alternatively, the number of component carriers can be indicated through a specific control channel to indirectly indicate how much ACK/NACK information should be transmitted.

Some data symbols may not be used for repetition of ACK/NACK information but be used to mean the state (DTX) where a control signal is not received. At this time, the last symbol location of the second slot can first be selected as the location of DTX by considering location of a sounding reference signal. Alternatively, DTX may be expressed in a type where symbol is not transmitted.

An example of another method for transmitting ACK/NACK information according to the aforementioned embodiment of the present invention will be described in detail. First of all, it is assumed that the base station transmits transport blocks using five downlink component carriers.

Figure 20:
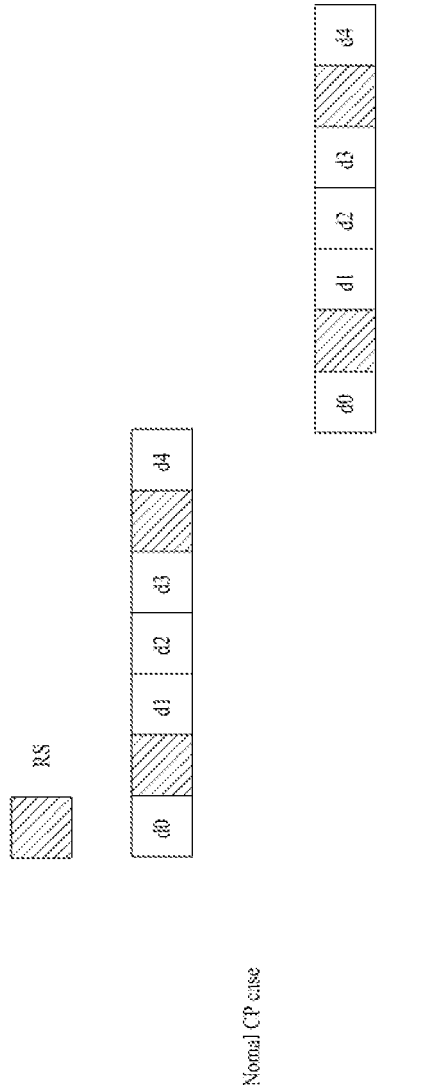
FIG. 20 is a diagram illustrating an example of transmitting ACK/NACK information according to one embodiment of the present invention in case of normal CP.

FIG. 20 is a diagram illustrating an example of transmitting ACK/NACK information according to one embodiment of the present invention in case of normal CP. In FIG. 20, d0 to d4 correspond to numbers of downlink component carriers. Namely, it means that ACK/NACK information of downlink component carrier #0 is d0, and ACK/NACK information of downlink component carrier #1 is d1.

At this time, BPSK or QPSK can be applied to d0 to d4. Modulation schemes applied to ACK/NACK information are independent from each another. Namely, BPSK may be applied to d0~d1 while QPSK may be applied to d2-d4.

Figure 21:
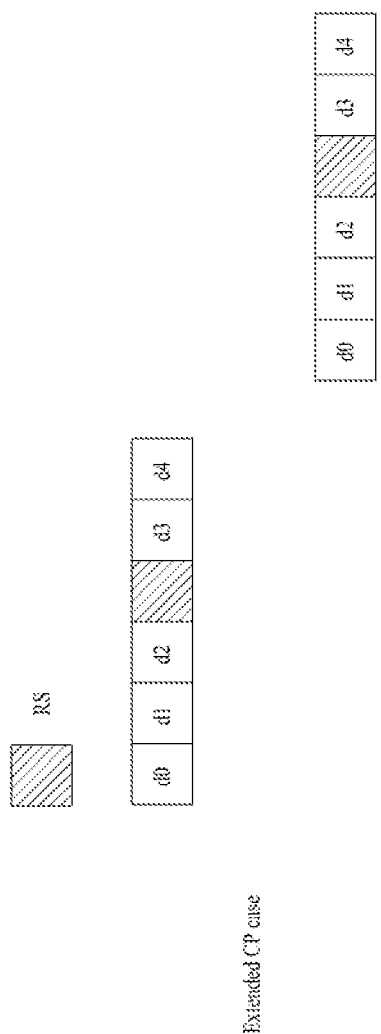
FIG. 21 is a diagram illustrating an example of transmitting ACK/NACK information according to one embodiment of the present invention in case of extended CP.

Likewise, FIG. 21 is a diagram illustrating an example of transmitting ACK/NACK information according to one embodiment of the present invention in case of extended CP.

Figure 22:
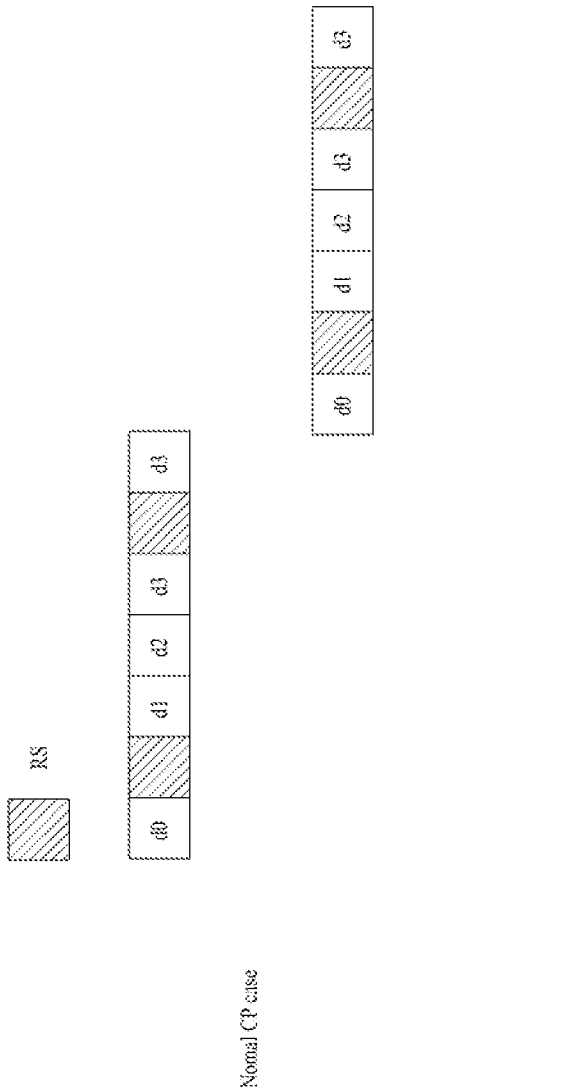
FIG. 22 is a diagram illustrating a case where ACK/NACK information of a specific downlink component carrier is repeated.

Also, ACK/NACK information of a specific downlink component carrier can only be repeated. FIG. 22 is a diagram illustrating a case where ACK/NACK information of a specific downlink component carrier is repeated.

Referring to FIG. 22, if the number of downlink component carriers is four (DL CC#0~3), ACK/NACK information of DL CC#3 can be repeated. In this case, it is preferable that the repeated ACK/NACK information d3 of DL CC#3 represents DTX.

The DTX can be expressed depending on transmission of corresponding data symbols. For example, if data symbols corresponding to a corresponding downlink component carrier are transmitted, it means that ACK/NACK is transmitted. If the data symbols are not transmitted, it can be set that DTX is transmitted.

Figure 23:
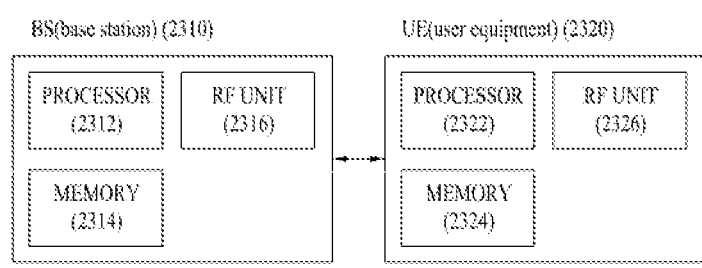
FIG. 23 is a diagram illustrating a base station and a user equipment that can be applied to the embodiment of the present invention.

FIG. 23 is a diagram illustrating a base station and a user equipment that can be applied to the embodiment of the present invention.

Referring to FIG. 23, the wireless communication system includes a base station (BS) 2310 and a user equipment (UE) 2320. In the downlink, the transmitter is a part of the base station 2310 and the receiver is a part of the user equipment 2320. In the uplink, the transmitter is a part of the user equipment 2320 and the receiver is a part of the base station 2310.

The base station 2310 includes a processor 2312, a memory 2314, and a radio frequency (RF) unit 2316. The processor 2312 can be configured to implement procedures and/or methods suggested in the present invention. The memory 2314 is connected with the processor 2312 and stores various kinds of information related to the operation of the processor 2312. The RF unit 2316 is connected with the processor 2312 and transmits and/or receives a radio signal. Namely, the RF unit 2316 includes a transmitting module and receiving module.

The user equipment 2320 includes a processor 2322, a memory 2324, and a radio frequency (RF) unit 2326. The processor 2322 can be configured to implement procedures and/or methods suggested in the present invention. The memory 2324 is connected with the processor 2322 and stores various kinds of information related to the operation of the processor 2322. The RF unit 2326 is connected with the processor 2322 and transmits and/or receives a radio signal. Namely, the RF unit 2326 includes a transmitting module and receiving module.

The base station 2310 and/or the user equipment 2320 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention can be applied to a wireless communication system. More specifically, the present invention can be applied to a method and apparatus for transmitting ACK/NACK information in a wireless communication system to which carrier aggregation is applied.

What is claimed is:

1. A method for receiving Acknowledgement/Negative Acknowledgement (ACK/NACK) information at a base station in a wireless communication system, the method comprising:
   transmitting a plurality of codewords corresponding to data blocks via physical downlink shared channels (PDSCHs) through a plurality of downlink carriers to a user equipment, wherein each of the plurality of downlink carriers carries two or more codewords; and
   after transmitting the plurality of codewords, receiving the ACK/NACK information via a physical uplink control channel (PUCCH) through one uplink carrier from the user equipment,
   wherein the ACK/NACK information includes ACK/NACK bits corresponding to the plurality of codewords, and the ACK/NACK bits are concatenated in accordance with an index order of the downlink carriers and an index order of the two or more codewords associated with each of the downlink carriers.

2. The method of claim 1, wherein a number of codewords transmitted through each of the plurality of downlink carriers depends on a transmission mode for each of the plurality of downlink carriers.

3. The method of claim 1, wherein a number of codewords transmitted through each of the plurality of downlink carriers is configured by a higher layer.

4. A base station comprising:
   a transmitting module configured to transmit a plurality of codewords corresponding to data blocks through a plurality of downlink carriers to a user equipment, wherein each of the plurality of downlink carriers carries two or more codewords; and
   a receiving module configured to receive Acknowledgement/Negative Acknowledgement (ACK/NACK) information through one uplink carrier from the user equipment,
   wherein the ACK/NACK information includes ACK/NACK bits corresponding to the plurality of codewords, and the ACK/NACK bits are concatenated in accordance with an index order of the downlink carriers and an index order of the two or more codewords associated with each of the downlink carriers.

5. The base station of claim 4, wherein a number of codewords transmitted through each of the plurality of downlink carriers depends on a transmission mode for each of the plurality of downlink carriers.

6. The base station of claim 4, wherein a number of codewords transmitted through each of the plurality of downlink carriers is configured by a higher layer.

\* \* \* \* \*